(No Model.)

W. H. BEARDSLEY & B. PERRY.
SAW FILING AND SETTING MACHINE.

No. 387,337. Patented Aug. 7, 1888.

Witnesses,
Geo. H. Strong.
J. B. Krouse.

Inventors,
Wm. H. Beardsley.
Bethune Perry.
By Dewey & Co.
attys

UNITED STATES PATENT OFFICE.

WILLIAM H. BEARDSLEY AND BETHUNE PERRY, OF EUREKA, CALIFORNIA.

SAW FILING AND SETTING MACHINE.

SPECIFICATION forming part of Letters Patent No. 387,337, dated August 7, 1888.

Application filed November 10, 1887. Serial No. 254,862. (No model.)

*To all whom it may concern:*

Be it known that we, WILLIAM H. BEARDSLEY and BETHUNE PERRY, of Eureka, Humboldt county, State of California, have invented an Improvement in Saw Filing and Setting Machines; and we hereby declare the following to be a full, clear, and exact description of the same.

Our invention relates to the class of machines for filing and setting saws; and our invention consists in the arrangement, construction, and combination of the hereinafter-described frames forming ways or guides, the novel sliding and adjustable anvil on one side of the frames for setting the saw-teeth, the movable and adjustable clamp on the other frame for holding the saw while being filed, the movable and adjustable holder for a file for bringing the saw to a round again, and details of construction, all of which will be more fully described.

The object of our invention is to provide a simple and readily-operating machine for filing and setting saws.

Figure 1:
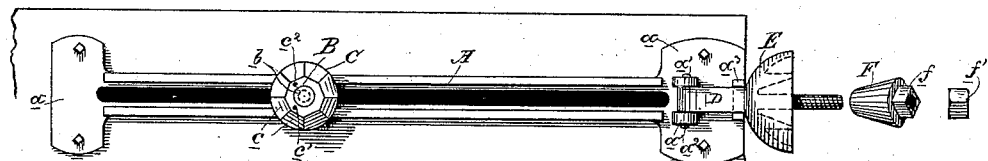
Figure 2:
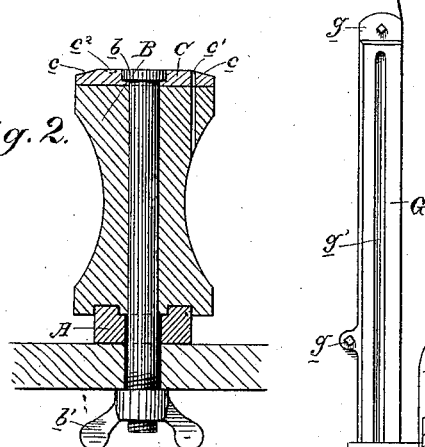
Figure 5:
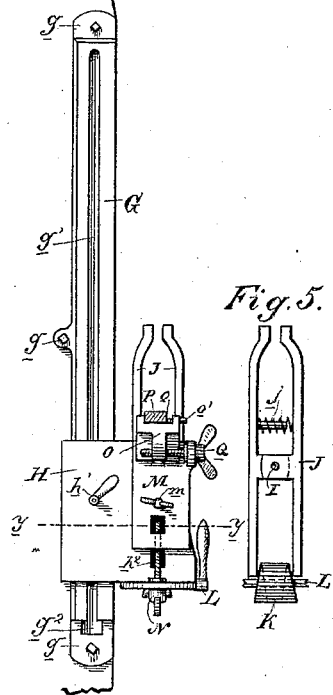
Figure 3:
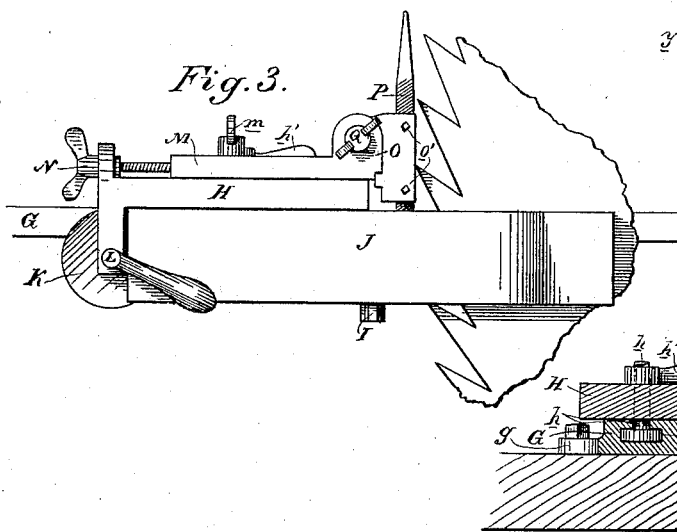
Figure 4:
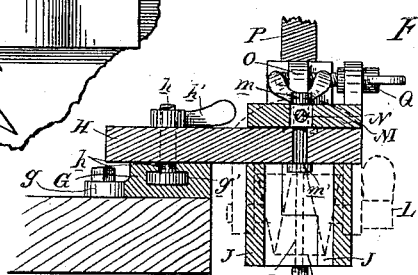

Referring to the accompanying drawings for a more complete explanation of our invention, Figure 1 is a plan of my saw filing and setting machine. Fig. 2 is a vertical section of the same. Fig. 3 is a side elevation of the clamp and the file-holder. Fig. 4 is a vertical cross-section on line $y\ y$ of Fig. 1. Fig. 5 is a plan of clamp J.

A is a metal frame, the sides of which form ways or guides upon which the anvil B is mounted and adapted to move back and forth, said anvil being adjusted and fixed in the position to which it is moved by means of a bolt, $b$, passing down through its center and between the sides or ways of the frame, and provided with a winged thumb-nut, $b'$, on its lower end. The frame A is provided with suitable lugs, $a$, by which it may be secured down to the bench upon which it is supported.

On the top of the anvil is fitted a disk, C, which turns about the upper end of the bolt $b$ as a center, and has the upper surface of its rim beveled down at $c$. It is also provided with a hole, $c'$, extending down through the top of the anvil, and with a small recess or countersink, $c^2$.

D is a spindle or mandrel having one end pivoted or hinged between lugs $a'$ on the frame A, by a bolt, $a^2$, and said spindle, when in a horizontal position, rests and is confined between guide lugs or notched bearing $a^3$ on the end of the frame. The projecting end of the spindle or mandrel is turned to receive a cup-shaped bearing-plate, E, and a cone, F, which fits into the bored-out portion in the center of the bearing-plate, said cone having on its forward end a square portion, $f$, to receive a wrench, and being held to its place on the spindle and in the bearing-plate by a nut, $f'$.

G is a metal frame, which is bolted down through lugs $g$ on the bench at right angles to the frame A and near its mandrel end, said frame having a longitudinal T-shaped groove or slot, $g'$, made in it. Upon this frame is fitted an apron-plate, H, which is held thereto and adapted to slide back and forth thereon by means of a bolt, $h$, having a cross-head on its lower end, which is fitted to move in the groove $g'$ of the frame, and a handled nut, $h'$, on its top. The apron-plate may thus be moved along upon the frame G and held in any position desired by setting down the nut $h'$. Extending downward from one side of the apron H is a bolt, I, upon which are pivoted the oppositely-moving jaws of the clamp J, said jaws being held apart by the spring $j$, and being forced together by means of a wedge-shaped roll, K, operating between their rear ends, said roll being mounted in hangers depending from the apron and rotated by means of a crank-shaft, L. When this wedge-shaped roll is turned, it operates upon the rear ends of the jaws of the clamp, thereby forcing their forward ends together.

Upon ways upon one side of the apron is fitted, by means of grooves in its under surface, a plate, M, having a bolt, $m$, passing down through it, and provided on its lower end with a T or cross-head, $m'$, which passes into a slot, $h^2$, in the apron and, by being turned at right angles after passing into said slot, holds the plate M to its place. The bolt $m$ has on its top a handle by which it is readily operated. The plate M is moved back and forth on the apron H by means of a thumb screw, N.

O is a file-holder, having approximately a T shape, with a recess, $o$, in its front, within which the file P is fitted, said file being held in place by set-screws $o'$. The file-holder is carried by the plate M, and is mounted thereon in suitable grooves, whereby it may have a transverse movement, which is effected by means of a thumb-screw, Q.

The operation of the machine is as follows: The nut $f'$ and the cone F being removed from the mandrel D, the saw is fitted on it and up against the bearing-plate E. Then the cone is replaced on the mandrel and pressed into the eye of the saw as far as it will go, and the nut is then screwed up, so as to hold the cone in place. The mandrel is now turned to a vertical position, so as to bring the saw into a horizontal plane, and the sliding anvil B is then brought up under the teeth of the saw in such a position that the teeth rest above the downwardly-beveled rim of the anvil disk C. Now, by striking the teeth with a hammer, they are set. The object of the hole $c'$ in the anvil-disk and anvil is to enable the rivets of saws having insertible teeth to be driven out, which is done by bringing the rotating disk C around, so that the hole lies directly under the rivet, and then driving said rivet out with a punch.

The object of the recess or countersink $c^2$ in the anvil-disk is to provide for the insertion of fresh rivets, for by bringing said countersink around under the rivet-seat and then inserting a rivet and striking it with a hammer upon its head both ends will be set up at once. In setting the teeth, the saw is of course turned on the cone to bring each tooth into position over the anvil-disk. Now, in order to file the saw, it is brought around to a vertical position at the end of the frame A by turning the mandrel to a horizontal position, in which it rests, and is steadied between the guide-lugs $a^3$ on the end of the frame. The apron H is then set up on its guide-frame G until the jaws of the clamp J embrace the teeth of the saw, whereupon, by operating the crank-shaft L and the wedge-shaped roll K at the rear of the clamp-jaws, said jaws are set up against the saw and held firmly, preventing it from rotating and steadying it while it is being filed. After a period of use saws wear down so unequally as to get into a condition which is termed "out of round." When this is the case, we set up the plate M, so as to carry the file secured in the holder O into contact with the saw-teeth. The clamp J is loosened from its grip on the saw, and then, by fitting a wrench on the square portion $f$ of the cone F, the saw may be rotated, so that its teeth come successively into contact with the fixed file, whereby the saw is brought into round again. The transverse or lateral movement of the file-holder O enables us to set the file exactly to position against the teeth of the saw.

When the saw is simply being filed, the plate M may be removed from the machine by releasing its securing-bolt $m$ and thumb-screw N.

The apron H may be removed from its frame by sliding it back to the end of the frame, where a square portion, $g^2$, is made in the groove or slot $g'$ to allow the head of the bolt $h$ to come through.

Having thus described our invention, what we claim as new, and desire to secure by Letters Patent, is—

1. In a saw filing and setting machine, a support for the saw, in combination with the sliding adjustable clamp for gripping and holding the saw when being filed, said clamp consisting of hinged jaws embracing at their forward ends the edge of the saw-plate, and the rotary wedge-roll operating between the rear ends of the jaws of the clamp, whereby their forward ends are set up on the saw-plate, substantially as herein described.

2. In a saw filing and setting machine, a support for the saw, in combination with a fixed frame forming ways or guides, an apron-plate sliding on said frame, and a clamp carried by said apron-plate for embracing the edge of the saw-plate to hold it on its support, said clamp consisting of hinged jaws, a spring for holding the forward end of the jaws normally open, and a rotary wedge-roll carried by the apron-plate and operating between the rear ends of the jaws for closing their forward ends on the saw-plate, substantially as herein described.

3. In a saw filing and setting machine, a support for the saw, in combination with a fixed slotted frame, the apron sliding on said frame, the bolt and handled nut by which the apron is held to the frame and adjusted in position, the clamp carried by the apron and consisting of hinged jaws, the spring for holding the jaws normally open, and the rotary wedge-roll for closing them upon the saw-plate and holding it while being filed, substantially as herein described.

4. In a saw filing and setting machine, a frame provided with guide-lugs or a notched bearing on its end, and a mandrel hinged to said frame and fitted between the guides, said mandrel having a bearing-plate, cone, and nut for holding the saw, in combination with a second frame at right angles to the first frame, a sliding adjustable apron on said second frame, a clamp consisting of hinged jaws carried by the apron, a spring for holding the jaws normally open, and a rotary wedge-roll operating between the rear ends of the jaws to close their forward ends on the saw-plate and hold it steady on its mandrel while being filed, substantially as herein described.

5. In a saw filing and setting machine, a support for the saw, in combination with a sliding adjustable file-holder for setting the file up against the saw-teeth, said file-holder being mounted in transverse grooves, and a thumb-screw for moving it laterally and adjusting it in place, substantially as herein described.

6. In a saw filing and setting machine, a support for the saw, in combination with a sliding adjustable plate, a file-holder consisting of a recessed piece and set-screws for binding on the file, said holder being carried by the sliding plate and mounted thereon, and a thumb-screw, whereby said file-holder may be moved laterally, substantially as herein described.

7. In a saw filing and setting machine, a support for the saw, in combination with a frame forming guides or ways, an adjustable sliding apron thereon, an adjustable sliding plate on the apron, a clamp carried by the apron, and a file-holder carried by the plate and having a lateral adjustment, substantially as herein described.

8. In a saw filing and setting machine, a fixed frame forming ways or guides, and a hinged mandrel at one end for receiving the saw, and a bearing-plate, cone, and nut for holding the saw on the mandrel, in combination with a sliding adjustable anvil on the ways or guides of the frame having a beveled rim on its top, whereby the saw-teeth may be set, substantially as herein described.

9. In a saw filing and setting machine, a frame forming ways or guides, a hinged mandrel at one end thereof, and a bearing-plate, cone, and nut on the mandrel for holding the saw, in combination with an adjustable sliding anvil on the ways or guides of the frame having a rotary disk in its top, with a downwardly-beveled outer edge or rim, whereby the teeth of the saw may be set, substantially as herein described.

10. In a saw filing and setting machine, a guide-frame, a hinged mandrel at one end thereof, and a bearing-plate, cone, and nut for holding the saw on the mandrel, in combination with an adjustable sliding anvil on the guide-frame, and a rotary disk with a beveled edge or rim on the top of the anvil, and a hole through the disk and anvil top, substantially as herein described.

11. In a saw filing and setting machine, a guide-frame, a hinged mandrel at one end thereof, and a bearing-plate, cone, and nut for holding the saw on the mandrel, in combination with a sliding adjustable anvil on the frame, a rotary top disk having beveled outer rim, and a countersink in said disk, substantially as herein described.

12. A saw filing and setting machine, comprising a guide-frame having at one end a hinged mandrel provided with bearing-plate, cone, and nut for holding the saw on the mandrel, a sliding adjustable anvil on said frame and having a rotary disk with a beveled rim for setting the teeth of the saw, a second guide-frame at right angles to the first and near its end, a sliding adjustable apron on said frame, and a clamp carried by the apron for embracing and holding the saw while being filed, said clamp consisting of hinged jaws, a spring for holding the jaws normally open, and a rotary hinged roll operating between their rear ends for closing their forward ends on the saw-plate, substantially as herein described.

In witness whereof we have hereunto set our hands.

WILLIAM H. BEARDSLEY.
BETHUNE PERRY.

Witnesses:
  J. S. MURRAY,
  GEO. R. GIBOAN.